US011500932B2

(12) United States Patent
Kulkarni et al.

(10) Patent No.: US 11,500,932 B2
(45) Date of Patent: Nov. 15, 2022

(54) CHANGE-POINT DRIVEN FEATURE SELECTION FOR MULTI-VARIATE TIME SERIES CLUSTERING

(71) Applicant: International Business Machines Corporation, Armonk, NY (US)

(72) Inventors: Kedar Kulkarni, Bangalore (IN); Padmanabha Venkatagiri Seshadri, Mysore (IN); Satyam Dwivedi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 16/877,981

(22) Filed: May 19, 2020

(65) Prior Publication Data

US 2021/0365498 A1   Nov. 25, 2021

(51) Int. Cl.
*G06F 16/901*    (2019.01)
*G06F 16/28*    (2019.01)
*G06K 9/62*    (2022.01)

(52) U.S. Cl.
CPC ........ *G06F 16/9024* (2019.01); *G06F 16/285* (2019.01); *G06K 9/6215* (2013.01); *G06K 9/6224* (2013.01)

(58) Field of Classification Search
CPC .............. G06F 16/9024; G06F 16/285; G06F 16/24568; G06F 16/2264; G06F 16/2477; G06F 16/283; G06F 16/2228; G06F 16/906; G06K 9/6215; G06K 9/6224; G06K 9/6218; G06N 7/023

USPC ........................................................ 707/798
See application file for complete search history.

(56) References Cited

U.S. PATENT DOCUMENTS

| 5,083,860 A | 1/1992 | Miyatake et al. |
| 5,841,676 A | 11/1998 | Ali et al. |
| 7,103,222 B2 | 9/2006 | Peker |
| 8,645,304 B2 | 2/2014 | Jiang et al. |

(Continued)

OTHER PUBLICATIONS

Venkata Jandhyala et al., "Inference for Single and Multiple Change-Points in Time Series", Journal of Time Series Analysis, May 11, 2013, 24 pages, Wiley Online Library.

(Continued)

*Primary Examiner* — Evan Aspinwall
(74) *Attorney, Agent, or Firm* — Ference & Associates LLC (57) ABSTRACT

One embodiment provides a method, including: receiving a multi-variate time-series dataset comprising a plurality of time-dependent datasets; for each of the plurality of time-dependent datasets, segmenting each of the plurality of time-dependent datasets at a transition point; clustering segments of the plurality of time-dependent datasets into clusters having similar lengths of segments; for each cluster (i) selecting a representative segment length and (ii) identifying a feature subset in that cluster; identifying, across the feature subsets, subset transition points, wherein each of the subset transition points corresponds to a change in value that meets a predetermined threshold within its corresponding feature subset; and determining, by applying a threshold test to the subset transition points, a segment length to be used in segmenting the entire multi-variate time-series dataset.

20 Claims, 5 Drawing Sheets

(56) References Cited

U.S. PATENT DOCUMENTS

| | | | |
|---|---|---|---|
| 8,972,308 B2 | 3/2015 | Hao et al. | |
| 2012/0323537 A1 | 12/2012 | Bocharov et al. | |
| 2013/0110753 A1* | 5/2013 | Hao | G06N 5/02 706/46 |
| 2016/0110478 A1 | 4/2016 | Aggour et al. | |
| 2016/0292196 A1 | 10/2016 | Yan et al. | |
| 2016/0371376 A1* | 12/2016 | Hassan | G06K 9/6218 |
| 2017/0147930 A1* | 5/2017 | Bellala | G06N 5/04 |

OTHER PUBLICATIONS

Kaylea Haynes et al., "Efficient Penalty Search for Multiple Changepoint Problems", Dec. 11, 2014, 23 pages, arXiv:1412.3617v1 [stat.CO].

Charu C. Aggarwal, "Outlier Analysis", Second Edition, Nov. 25, 2016, 54 pages, IBM T.J. Watson Research Center, Yorktown Heights, New York, USA.

* cited by examiner

CHANGE-POINT DRIVEN FEATURE SELECTION FOR MULTI-VARIATE TIME SERIES CLUSTERING

BACKGROUND

Multi-variate time series datasets are datasets that include more than one time-dependent dataset or feature. Each time-dependent dataset or feature within a multi-variate time-series dataset is typically dependent upon other time-dependent datasets or features within the multi-variate time series dataset. A univariate time series dataset is similar except that it includes only a single time-dependent dataset or feature within the dataset. Time series datasets are produced by many different devices and used in many different applications. For example, a time series dataset may be generated that tracks particular weather features over time. This time series dataset can then be used for weather forecasting. As another example, a time series dataset may be generated from sensors that are monitoring residential or commercial building conditions. This time series dataset can then be used to identify any abnormalities in current or future building conditions. Thus, the information contained within the time series dataset is very useful in analysis, prediction, monitoring, or the like, applications.

BRIEF SUMMARY

In summary, one aspect of the invention provides a method, comprising: receiving a multi-variate time-series dataset comprising a plurality of time-dependent datasets; for each of the plurality of time-dependent datasets, segmenting that time-dependent dataset at a transition point, wherein each of the transition points corresponds to a change in value that meets a predetermined threshold and occurs over a period of time; clustering segments of the plurality of time-dependent datasets into clusters having similar lengths of segments; for each cluster (i) selecting a representative segment length and (ii) identifying a feature subset in that cluster, wherein a feature subset comprises features from the time-dependent datasets that can be represented by the representative segment for the given cluster; identifying, across the feature subsets, subset transition points, wherein each of the subset transition points corresponds to a change in value that meets a predetermined threshold within its corresponding feature subset; and determining, by applying a threshold test to the subset transition points, a segment length to be used in segmenting the entire multi-variate time-series dataset.

Another aspect of the invention provides an apparatus, comprising: at least one processor; and a computer readable storage medium having computer readable program code embodied therewith and executable by the at least one processor, the computer readable program code comprising: computer readable program code configured to receive a multi-variate time-series dataset comprising a plurality of time-dependent datasets; computer readable program code configured to, for each of the plurality of time-dependent datasets, segment that time-dependent dataset at a transition point, wherein each of the transition points corresponds to a change in value that meets a predetermined threshold and occurs over a period of time; computer readable program code configured to cluster segments of the plurality of time-dependent datasets into clusters having similar lengths of segments; computer readable program code configured to, for each cluster, (i) select a representative segment length and (ii) identify a feature subset, wherein a feature subset comprises features from the time-dependent datasets that can be represented by the representative segment for the given cluster; computer readable program code configured to identify, across the feature subsets, subset transition points, wherein each of the subset transition points corresponds to a change in value that meets a predetermined threshold within its corresponding feature subset; and computer readable program code configured to determine, by applying a threshold test to the subset transition points, a segment length to be used in segmenting the entire multi-variate time-series dataset.

An additional aspect of the invention provides a computer program product, comprising: a computer readable storage medium having computer readable program code embodied therewith, the computer readable program code executable by a processor and comprising: computer readable program code configured to receive a multi-variate time-series dataset comprising a plurality of time-dependent datasets; computer readable program code configured to, for each of the plurality of time-dependent datasets, segment that time-dependent dataset at a transition point, wherein each of the transition points corresponds to a change in value that meets a predetermined threshold and occurs over a period of time; computer readable program code configured to cluster segments of the plurality of time-dependent datasets into clusters having similar lengths of segments; computer readable program code configured to, for each cluster, (i) select a representative segment length and (ii) identify a feature subset, wherein a feature subset comprises features from the time-dependent datasets that can be represented by the representative segment for the given cluster; computer readable program code configured to identify, across the feature subsets, subset transition points, wherein each of the subset transition points corresponds to a change in value that meets a predetermined threshold within its corresponding feature subset; and computer readable program code configured to determine, by applying a threshold test to the subset transition points, a segment length to be used in segmenting the entire multi-variate time-series dataset.

A further aspect of the invention provides a method, comprising: receiving a time series dataset comprising a plurality of time-dependent features; identifying, for each of the plurality of time-dependent features, change points within a given time-dependent feature, wherein a change point corresponds to an aspect within a given time-dependent feature that has a value change amount that meets a predetermined threshold and occurs over a period of time; segmenting each of the plurality of time-dependent features at the change points identified for a given time-dependent feature; clustering segments of the time series dataset into clusters having similar lengths of segments; for each cluster (i) selecting a representative segment length and (ii) identifying a feature subset in that cluster, wherein a feature subset comprises features from the time-dependent datasets that can be represented by the representative segment for the given cluster; identifying, across the feature subsets, subset change points, wherein each of the subset change points corresponds to an aspect within a given feature subset that has a value change amount that meets a predetermined threshold and occurs over a period of time; and determining, by applying a threshold test to the subset change points, a segment length to be used in segmenting the time series dataset.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

For ease of readability, the multi-variate or univariate time series dataset will be referred to as a dataset, while the time-dependent datasets included in the multi-variate time series datasets will be referred to as a feature. Typically each feature within the time series dataset will vary over time. In other words, the value of the variable or information being tracked with the feature will vary over time. As an example, if the feature is tracking heartrate responses, the feature may vary as the heartrate responses vary. In order to effectively use the time series datasets, the datasets must be able to be effectively and accurately processed and analyzed. Processing and analyzing each individual feature and information contained within that feature is very resource and time intensive. Additionally, individually analyzing information contained within a feature provides little information because the context of the information is missing. Thus, in order to effectively process and analyze the information contained within the time series dataset, the dataset needs to be segmented so that portions of the individual features that provide useful information can be extracted. These portions can then be analyzed and processed in order to provide the desired insights regarding the information contained within the dataset.

Since features within a dataset are dependent upon other features within the dataset, segmenting of the dataset is important. However, the segmenting is also challenging because each feature within the dataset has different variations that occur at different times within the dataset. In other words, since each feature tracks or monitors a different variable, the values of the variables change at different points in time. Thus, if one segment length is picked based upon one feature, this may result in critical information of another feature being missed or excluded from the segment. However, there is currently no system that can select an optimal or sufficient segment length for the dataset that results in a balance between (i) having enough segments so that critical information is captured and (ii) having too many segments resulting in a system that is too sensitive.

Conventionally, systems are able to segment single features by identifying transition points within the feature. The system then computes the penalty value for this change-point value. The system then varies the change-point value and computes the corresponding penalty value for each change-point. This produces a plot where an optimal or sufficient segment length can be identified based upon the knee point of the plot. However, this technique cannot be used on a multi-variate time-series dataset directly because each feature within the dataset has different optimal or sufficient segment lengths. Thus, applying the above described technique directly to a multi-variate time-series dataset would result in inaccurate and inefficient segment length calculations for the entirety of the dataset.

Accordingly, an embodiment provides a system and method for determining a segment length for a multi-variate time-series dataset by generating a homogenous multi-variate time-series dataset from clustered segments of the time-dependent datasets within the multi-variate time series dataset, identifying a number of segment points resulting within the homogenous multi-variate time series dataset, and determining a sufficiency of that number of segment points. The system receives a multi-variate time-series dataset that includes multiple time-dependent datasets or features. Each of the features within the dataset corresponds to a variable that is being tracked or monitored. Thus, each feature includes variations as the value of the variable varies over time, thereby causing transition points that correspond to points in time where the value of the variable exceeds a predetermined threshold.

The system segments each of the features, individually, at the transition points within the feature, thereby resulting in segments having a length. Once all the features are segmented, the system clusters the segments across the features, meaning all of the segments regardless of the feature corresponding to the segment are clustered into clusters. The segments within a cluster have a similarity, specifically, a similar segment length. The similarity of the segment lengths may be based upon a predetermined threshold. Thus, each cluster may include segments from multiple features. The system selects a representative segment length for each cluster and generates a feature subset for each cluster based upon features whose change segments are largely represented by the representative segment length.

The feature subsets are more homogenous than the original set of features in the dataset. Thus, the system can apply a multi-variate change-point segmentation across the homogenous feature subsets. This segmentation results in a set of transition points for the feature subset. To determine a sufficient or optimal segment length, the system applies a threshold test to the set of subset transition points. The threshold test includes both a lower boundary and an upper boundary. If the number of transition points within the subset transition point set is lower than the lower boundary, the system augments the subset transition point set. The augmentation includes segmenting the homogenous feature subsets utilizing the representative segment length. These segments are then added to the segments included in the subset transition point set. If the number of transition points within the subset transition point set is higher than the upper boundary, then the subset transition point set is discarded and the system utilizes the segment length corresponding to the representative segment to segment the dataset. If the number of transition points within the subset transition point set is between the upper and lower boundary, the system utilizes the subset transition point set for segmenting the dataset.

Such a system provides a technical improvement over current systems for segmenting multi-variate time series datasets or feature sets. The described system applies traditional feature segmentation techniques to each feature within the dataset. The system generates a feature subset by clustering the segments, selecting a representative segment for each cluster, and mapping the representative segment to the features. The resulting feature subset is more homogenous than the original dataset which allows for application of multi-variate change-point segmentation on the feature subset, which is not allowed in conventional systems due to the variance across the features. The multi-variate change-point segmentation can then be used to identify a sufficient segment length for the multi-variate time series dataset. Thus, the described system and method provide a technique that allows for computation of a segment length that is sufficient for the entire dataset and not just segment lengths that are sufficient for an individual feature of the dataset as found in conventional techniques. Accordingly, the described system and method provide a technique that allows for efficient segmentation of the entire dataset as a whole, thereby resulting in a number of segment that allows for proper analysis of the information but not so many segments that would result in an inefficient use of processing resources and time.

Figure 1:
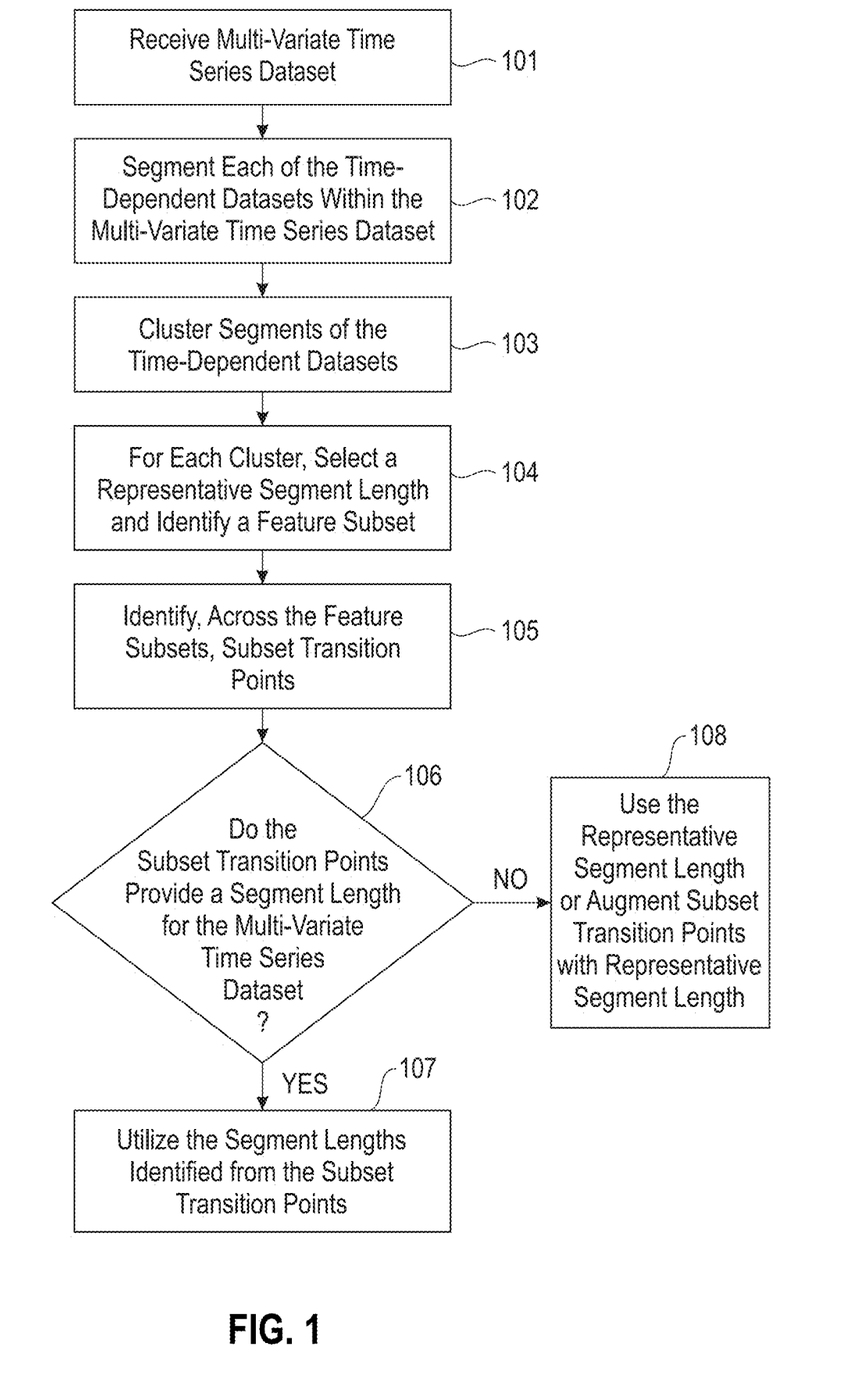
FIG. 1 illustrates a method of determining a segment length for a multi-variate time-series dataset by generating a homogenous multi-variate time-series dataset from clustered segments of the time-dependent datasets within the multi-variate time series dataset, identifying a number of segment points resulting within the homogenous multi-variate time series dataset, and determining a sufficiency of that number of segment points.

FIG. 1 illustrates a method for determining a segment length for a multi-variate time-series dataset by generating a homogenous multi-variate time-series dataset from clustered segments of the time-dependent datasets within the multi-variate time series dataset, identifying a number of segment points resulting within the homogenous multi-variate time series dataset, and determining a sufficiency of that number of segment points. At 101 the system receives a multi-variate time-series dataset, referred to as dataset, which includes multiple time-dependent datasets or features, referred to as features. The features may be independent of other features within the dataset. Alternatively, features may have some dependency, for example, values from one feature may have an effect on values from another feature. Receipt of the dataset may be by way of any technique for obtaining information, for example, a user uploading the dataset to the system, the system accessing a data storage location storing the dataset, the system interfacing with a system creating the dataset, or the like. FIG. 2A illustrates an example multi-variate time-series dataset 200. Each feature 201, 202, and 203 are represented by different line styles.

It should be noted that the described system can also be applied to a univariate time-series dataset. However, the univariate time-series dataset is a much simpler case and will, therefore, not be described in depth herein as this case eliminates some of the described steps, specifically those referring to performance of steps across the entire dataset since, in a univariate time-series dataset, the dataset only includes a single time-dependent feature. Accordingly, it should be obvious to one skilled in the art how the described system can be applied to a univariate time-series dataset.

At 102, the system segments each of the features at transition points occurring within a feature. Each feature tracks or monitors a value or variable. Thus, as the value or variable changes (e.g., increases, decreases, etc.) the feature changes. At each time that the value change exceeds a predetermined threshold, the system identifies this as a transition point within the feature. The predetermined threshold corresponds to an amount of change in the value and not the actual value itself. In other words, to exceed the predetermined threshold, the value has to change by an amount corresponding to the threshold. For example, if the predetermined threshold value is 5 units, a change in value of a feature from −3 units to 2 units would meet the threshold and, therefore, be classified as a transition point. The predetermined threshold can vary and, based upon the predetermined threshold value, the sensitivity of the system changes. Stated differently, as the threshold changes, whether the system identifies a change in value of a feature as a transition point, changes.

The transition points do not have to occur at a single time point. Rather, the transition points can occur over a time period. For example, referring to FIG. 2A, the vertical dashed lines represent occurrences of transition points. Some of the transition points occur at effectively a single point in time, for example, as shown at 207, where the transition of feature 202 occurs at a single point in time. Alternatively, some of the transition points occur over a time period, for example, as represented by 208. The beginning of the transition is designated with a first vertical dashed line and the end of the transition is designed with a second vertical dashed line. As can be seen, feature 201 starts a transition beginning at a time period associated with the first vertical dashed line corresponding to the transition point 208, and the transition ends at a time period associated with the second vertical dashed line corresponding to the transition point 208. Both of these types of transitions are referred to as a transition point. To assist in identifying the transition points, the system may scale the individual features so that the transition point identification for each feature is consistent across the dataset.

Once the transition points are identified for each feature within the dataset, the system computes the change point or transition point values and corresponding penalty value. Identifying penalty values for change points is a conventional technique that is well known in the art. The transition point value corresponds to the number of transition points that are identified based upon a particular threshold value. The number of transition points can then be used to compute the penalty value for that transition point value. This correlation is plotted on a graph. The system then iteratively performs the transition-point penalty-value computation utilizing different transition point values. The transition point values that are used are based upon changing the predetermined threshold that is used to identify whether a change in a value of the feature is classified as a transition point. In other words, the system changes the sensitivity of the transition point classification by modifying the threshold value, thereby resulting in different numbers of transition points based upon the sensitivity. The system can compute a corresponding penalty value for each of the transition point numbers and plot the correlation on the graph.

From the graph the system can identify an optimal or sufficient transition point value for each individual feature. An optimal or sufficient transition point value is a transition point value that balances (i) the need for enough segments so that accurate analyses can be performed using the data (e.g., critical information is not lost due to too few segments) and (ii) the need to reduce the number of segments so that necessary processing and time resources can be reduced (e.g., there are not so many segments that processing and analysis of the segments takes significant time and processing resources). To identify the sufficient transition point value, the system utilizes a knee or elbow detection algorithm that identifies the knee or elbow of the graph. The knee or elbow of the graph is the location on the graph where the graph has lower curvature on either side of the point. In other words, the knee or elbow of the graph is the location where the curvature has a local maximum. As a simple example, although not one likely to be found in practice due to the mechanisms of a graph, if the graph appeared as a ninety degree angle, the knee of the graph would be the vertex of the ninety degree angle, since on either side of this vertex the curvature of the graph is effectively zero.

The transition point value that corresponds to the knee or elbow of the graph is the optimal or sufficient number of change points or transition point value. Using this transition point value, the system can segment each feature within the dataset using the number of change points identified for the feature. This segmentation results in feature segments of different lengths since the system segments the feature based upon transition points which do not necessarily occur at consistent time intervals. The resulting segments are also referred to as time-deltas because the segment length corresponds to the length of time that occurs between the start of a segment and the end of the segment. In other words, once the optimal or sufficient transition point value is identified for each feature within the dataset, the system segments each feature individually using the optimal or sufficient transition point value that was identified for that feature. In the case of a univariate dataset, only the single feature of the dataset would be segmented using the optimal or sufficient transition point value identified for the single feature.

Figure 2A:
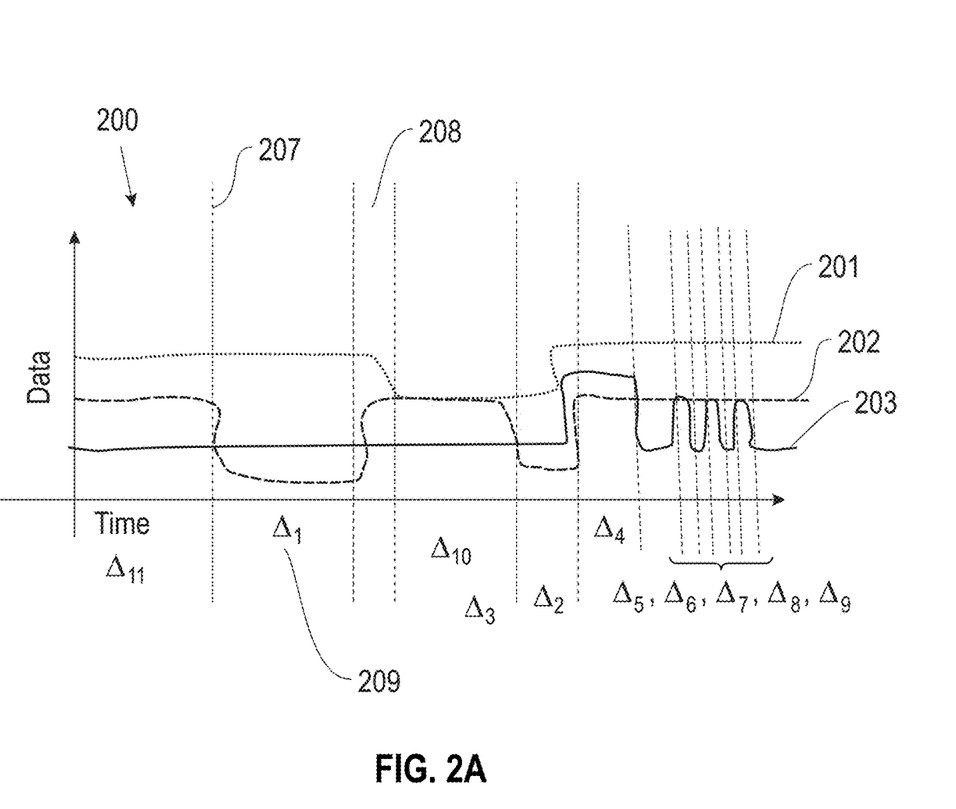
FIG. 2A illustrates an example multi-variate time series dataset.
Figure 2B:
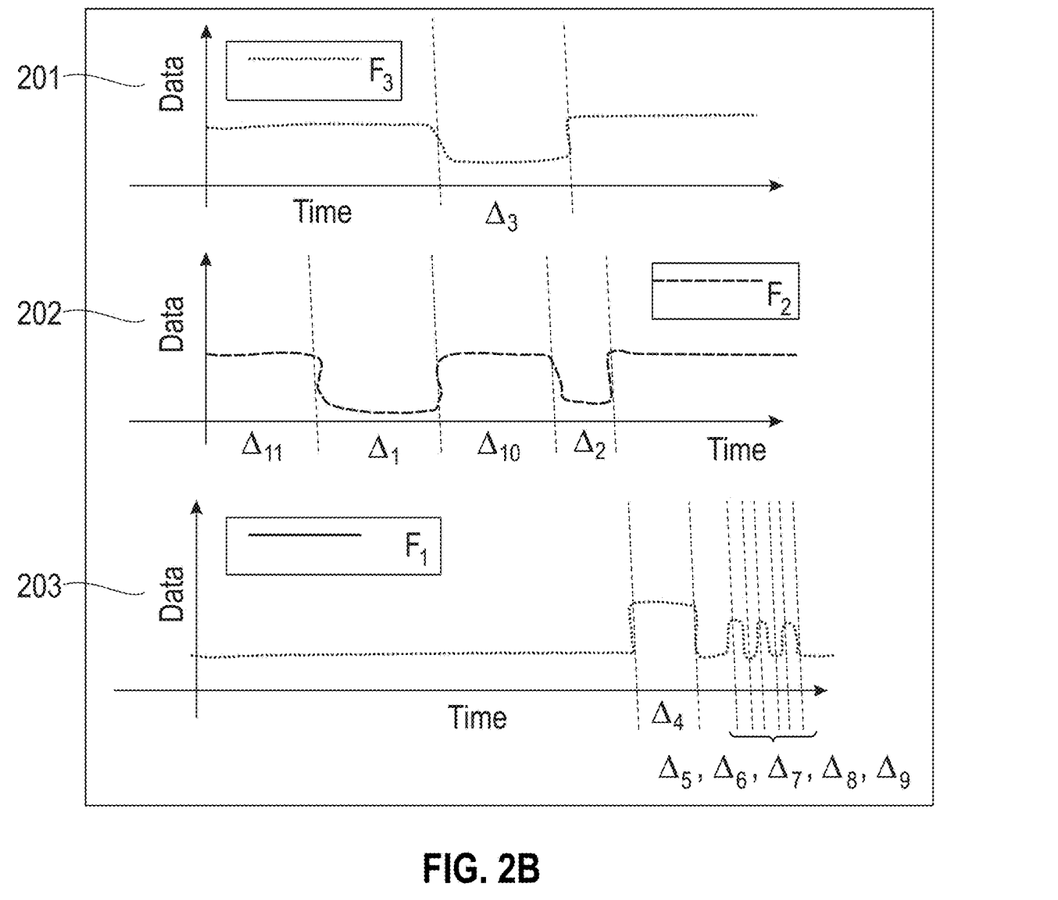
FIG. 2B illustrates an example of the individual time-dependent datasets.
Figure 2C:
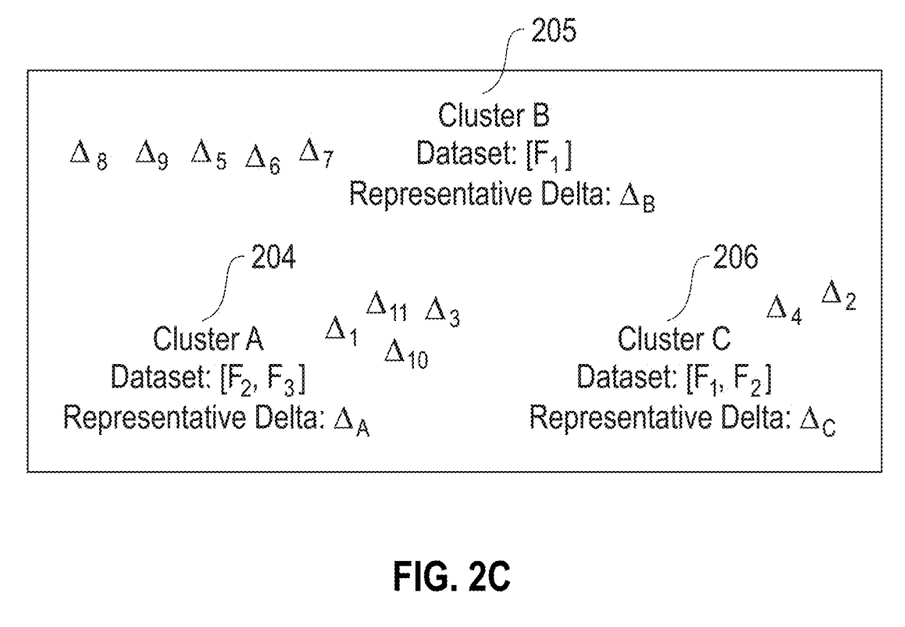
FIG. 2C illustrates an example of the multi-variate time-series dataset clustered by segment lengths of the time-dependent datasets.

FIG. 2B illustrates the segments that result from the multi-variate time-series dataset of FIG. 2A when utilizing the sufficient or optimal number of transition point values for each feature within the dataset. In this example, the sufficient or optimal number of transition points value for feature 3 ($F_3$) 201 was two, which resulted in a single segment represented between the two vertical dashed lines, represented as $\Delta_3$. On the other hand, the sufficient or optimal number of transition points value for feature 1 ($F_1$) 203 was eight, which resulted in six segments, represented as $\Delta_4$-$\Delta_9$. Feature 2 ($F_2$) 202 had a transition point value of four, which resulted in four segments represented by $\Delta_{11}$, $\Delta_1$, $\Delta_{10}$, and $\Delta_2$.

At 103 the system clusters the segments of the features into clusters that have similar lengths of segments. A similarity of lengths may be based upon a predetermined threshold similarity, a user-defined similarity, or the like. From the segments obtained at 102, the system matches and clusters the segments across the features within the dataset. Since the clustering is performed across all features, a single cluster may include segments from more than one feature. The clustering may utilize one or more clustering techniques, for example, k-means clustering, mean shift clustering, Gaussian mixture modeling, fuzzy clustering, and the like. The clustering results in clusters, each of which includes segments having similar lengths regardless of the feature corresponding to the segment. FIG. 2C illustrates the resulting clusters based upon clustering the segments represented in FIG. 2B. Cluster A 204 includes the segments represented by $\Delta_1$, $\Delta_3$, $\Delta_{10}$, and $\Delta_{11}$. Thus, Cluster A 204 includes segments from Feature 2 202 and Feature 3 201. Cluster B 205 includes the segments represented by $\Delta_5$, $\Delta_6$, $\Delta_7$, As, and $\Delta_9$. Thus, Cluster B 205 includes segments from Feature 1 203. Cluster C 206 includes the segments represented by $\Delta_2$ and $\Delta_4$. Thus, Cluster C 206 includes segments from Feature 1 203 and Feature 2 202.

For each cluster, the system selects a representative segment length and identifies a feature subset at 104. To select the representative segment length, the system may use any type of statistical aggregation technique, for example, averaging the segment lengths within the cluster and selecting the average length as the representative segment length.

The system may also simply select a representative segment length from the segments within the cluster, for example, based upon frequency of occurrence of a particular segment length within a cluster, based upon a histogram of segment lengths, or based upon a rule set by a user or the system. The representative segment length selected for FIG. 2C for each cluster is based upon the mean or average segment length within the cluster. Thus, the representative segment for Cluster A 204 is $\Delta_A$, for Cluster B 205 is $\Delta_B$, and for Cluster C 206 is $\Delta_C$.

The feature subset represents features whose change segments are largely represented by the representative segment length. To obtain the feature subset the system maps the segments within the cluster to the feature corresponding to the segment. For example, the system may obtain the top-k features that correspond to a segment length distance from the representative segment length. As another example, the system may use a histogram of occurrence of features that correspond to the segment lengths within a cluster. These could then be ranked and selected by occurrence. The resulting features that map to each cluster are then more homogenous than the original dataset due to the use of the representative segment length for each cluster. Thus, the feature subsets are used to generate a new multi-variate time series dataset based upon the representative cluster and feature subsets, with this new multi-variate time series dataset being more homogenous than the original dataset. The representative segment length and mappings may be stored in a database as a reference for any necessary further analysis.

At 105 the system identifies subset transition points from the feature subsets. Identifying the subset transition points is performed in a similar manner as previously described, specifically, by setting a threshold value and identifying when a change in value within the subset dataset meets or exceeds the threshold value. One difference between the subset transition point identification and the transition point identification previously described is that the subset transition point identification is performed across the entire feature subset rather than each individual feature within the feature subset. As previously described, the system may iteratively perform the subset transition point identification utilizing different threshold values and computing a penalty value for each resulting subset transition point value. The system may then detect the knee or elbow of the resulting plot and select the corresponding value as the number of subset transition points. This results in a set of subset transition points.

At 106 the system determines whether the subset transition points provide a sufficient segment length for segmenting the original multi-variate time series dataset as a whole or in its entirety, rather than by individual feature. To make this determination, the system applies a threshold test to the subset transition points. The threshold test includes a lower threshold boundary and an upper threshold boundary. The system then determines where the number of transition points within the subset transition point set falls in view of the upper and lower boundary of the threshold test. If the system determines the number of transition points within the subset transition point set falls between the upper and lower boundary, the system utilizes the segment change points identified from the subset transition point set at 107. In other words, if the number of transition points falls within the upper and lower boundary, the system retains the subset transition point set for use in segmenting the original dataset.

If the system determines the number of transition points within the subset transition point set is below the lower threshold boundary, meaning there are too few transition points, the system augments the subset transition point set. To augment the subset transition point set, the system additionally segments the homogenous multi-variate time-series dataset utilizing the segment length corresponding to the representative segment length. This results in additional transition points and, therefore, additional segments being generated. If the system determines the number of transition points within the subset transition point set is above the upper threshold boundary, meaning there are too many segments and the system is too sensitive, the system discards the subset transition point set. The system instead utilizes the representative segment length to segment the multi-variate time-series dataset.

Thus, the described systems and methods represent a technical improvement over current systems for segmenting multi-variate time series datasets or feature sets. Conventional systems are unable to accurately and efficiently segment multi-variate time series datasets due to the variance across the features within the dataset. Thus, the described system and method provide a technique that can identify a sufficient segment length for the multi-variate time series dataset. Using the sufficient segment length across the entirety of the dataset allows for efficient segmentation of the dataset without incurring the processing and time expenses of having too many segments within the dataset. Accordingly, the described system and method provides a technique that allows for more efficient and accurate processing and analysis of the dataset in order to make accurate analyses, predictions, abnormality identifications, or the like, with respect to the dataset and the asset that is being monitored via the dataset.

Figure 3:
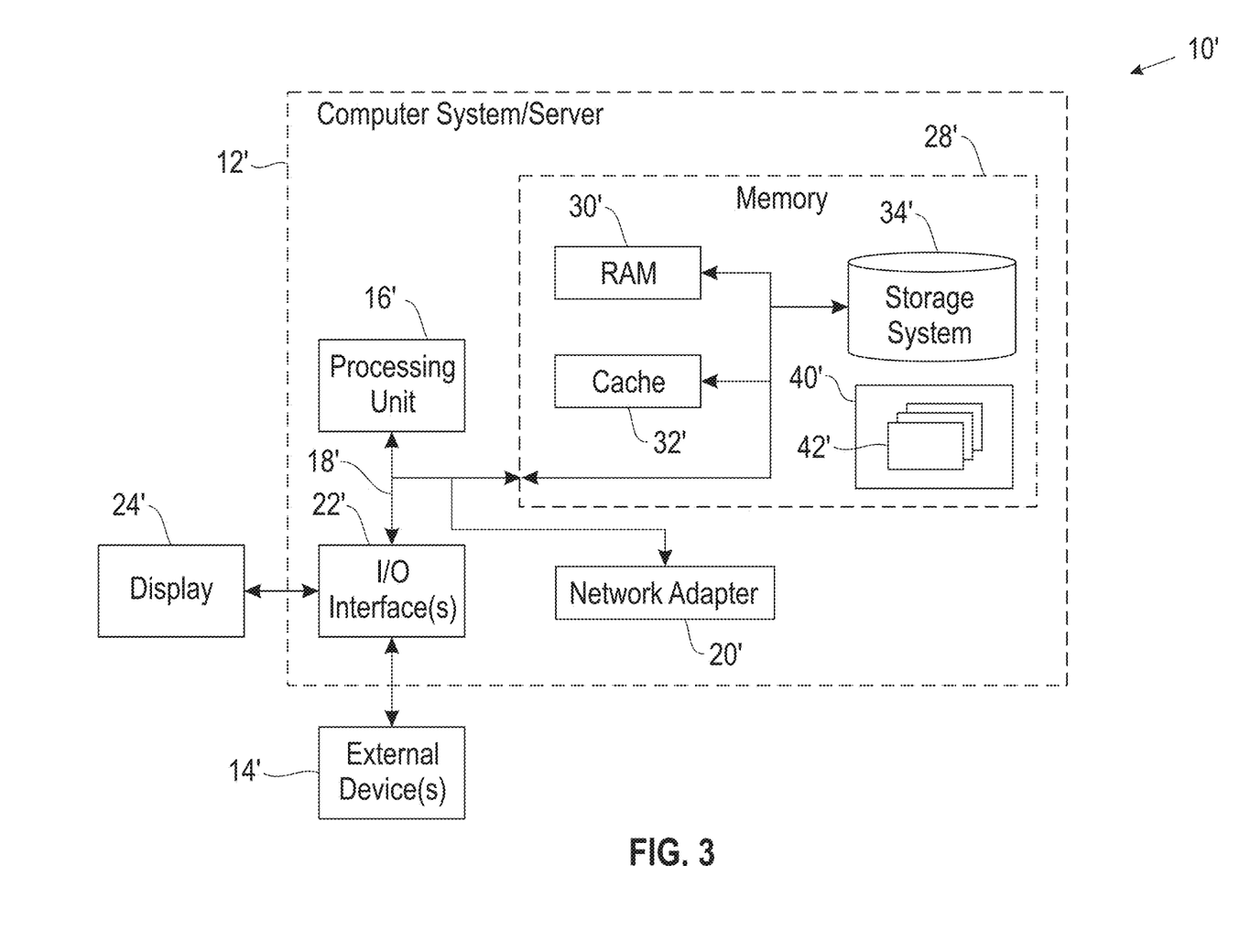
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving a multi-variate time-series dataset comprising a plurality of time-dependent datasets;
for each of the plurality of time-dependent datasets, segmenting that time-dependent dataset at a transition point, wherein each of the transition points corresponds to a change in value that meets a predetermined threshold and occurs over a period of time, wherein segments of each of the time-dependent dataset resulting from the segmenting have different lengths, wherein a number of segments for each of the plurality of time-dependent datasets differs between the plurality of time-dependent datasets;
clustering the segments across the plurality of time-dependent datasets into clusters having similar lengths of segments, wherein at least one of the clusters comprises segments from more than one of the plurality of time-dependent datasets;
for each cluster (i) selecting a representative segment length and (ii) identifying a feature subset in that cluster, wherein a feature subset comprises features from the time-dependent datasets that can be represented by the representative segment for the given cluster;
generating a new multi-variate time series dataset from the representative segment lengths and the feature subsets of the clusters;
identifying, across the new-multi-variate time series dataset, subset transition points, wherein each of the subset transition points corresponds to a change in value that meets a predetermined threshold within its corresponding feature subset; and
determining, by applying a threshold test to the subset transition points, a segment length to be used in segmenting the entire multi-variate time-series dataset.

2. The method of claim 1, wherein the segmenting comprises an iterative segmenting process that results in different numbers of segments across each iteration of the segmenting via modifying the predetermined threshold for each iteration.

3. The method of claim 2, comprising selecting a time-dependent dataset segment length by (i) forming a graph of the different numbers of segments produced via the iterative segmenting process and (ii) identifying a knee point within the graph, wherein the knee point of the graph corresponds to a segment length and is selected as the time-dependent dataset segment length, the knee point comprising a local maximum of the graph.

4. The method of claim 1, wherein the threshold test comprises a lower threshold boundary and an upper threshold boundary.

5. The method of claim 4, wherein the determining comprises (i) identifying that a number of the subset transition points are below the lower threshold boundary and (ii) augmenting the subset transition points with an additional segmentation of the multi-variate time-dependent datasets utilizing the representative segment length.

6. The method of claim 4, wherein the determining comprises (i) identifying that a number of the subset transition points are above the upper threshold boundary and (ii) selecting the representative segment length as the segment length.

7. The method of claim 4, wherein the determining comprises (i) identifying that a number of the subset transition points are within the lower threshold boundary and the upper threshold boundary and (ii) selecting the subset transition points as the segment change points.

8. The method of claim 1, wherein identifying a feature subset comprises mapping a given segment within a cluster to the time-dependent dataset that the given segment occurs within.

9. The method of claim 1, wherein the selecting a representative segment length for a given cluster comprises averaging the segment lengths within the given cluster.

10. The method of claim 1, wherein the identifying subset transition points comprises identifying a change in value within the feature subset that at least meets a predetermined threshold.

11. An apparatus, comprising:
at least one processor; and
a computer readable storage medium having computer readable program code embodied therewith and executable by the at least one processor, the computer readable program code comprising:
computer readable program code configured to receive a multi-variate time-series dataset comprising a plurality of time-dependent datasets;

computer readable program code configured to, for each of the plurality of time-dependent datasets, segment that time-dependent dataset at a transition point, wherein each of the transition points corresponds to a change in value that meets a predetermined threshold and occurs over a period of time, wherein segments of each of the time-dependent dataset resulting from the segmenting have different lengths, wherein a number of segments for each of the plurality of time-dependent datasets differs between the plurality of time-dependent datasets;

computer readable program code configured to cluster the segments across the plurality of time-dependent datasets into clusters having similar lengths of segments, wherein at least one of the clusters comprises segments from more than one of the plurality of time-dependent datasets;

computer readable program code configured to, for each cluster, (i) select a representative segment length and (ii) identify a feature subset, wherein a feature subset comprises features from the time-dependent datasets that can be represented by the representative segment for the given cluster;

computer readable program code configured to generate a new multi-variate time series dataset from the representative segment lengths and the feature subsets of the clusters;

computer readable program code configured to identify, across the new-multi-variate time series dataset, subset transition points, wherein each of the subset transition points corresponds to a change in value that meets a predetermined threshold within its corresponding feature subset; and computer readable program code configured to determine, by applying a threshold test to the subset transition points, a segment length to be used in segmenting the entire multi-variate time-series dataset.

12. A computer program product, comprising:

a computer readable storage medium having computer readable program code embodied therewith, the computer readable program code executable by a processor and comprising:

computer readable program code configured to receive a multi-variate time-series dataset comprising a plurality of time-dependent datasets;

computer readable program code configured to, for each of the plurality of time-dependent datasets, segment that time-dependent dataset at a transition point, wherein each of the transition points corresponds to a change in value that meets a predetermined threshold and occurs over a period of time, wherein segments of each of the time-dependent dataset resulting from the segmenting have different lengths, wherein a number of segments for each of the plurality of time-dependent datasets differs between the plurality of time-dependent datasets;

computer readable program code configured to cluster the segments across the plurality of time-dependent datasets into clusters having similar lengths of segments, wherein at least one of the clusters comprises segments from more than one of the plurality of time-dependent datasets;

computer readable program code configured to, for each cluster, (i) select a representative segment length and (ii) identify a feature subset, wherein a feature subset comprises features from the time-dependent datasets that can be represented by the representative segment for the given cluster;

computer readable program code configured to generate a new multi-variate time series dataset from the representative segment lengths and the feature subsets of the clusters;

computer readable program code configured to identify, across the new-multi-variate time series dataset, subset transition points, wherein each of the subset transition points corresponds to a change in value that meets a predetermined threshold within its corresponding feature subset; and computer readable program code configured to determine, by applying a threshold test to the subset transition points, a segment length to be used in segmenting the entire multi-variate time-series dataset.

13. The computer program product of claim 12, wherein the segmenting comprises an iterative segmenting process that results in different numbers of segments across each iteration of the segmenting via modifying the predetermined threshold for each iteration.

14. The computer program product of claim 13, comprising selecting a time-dependent dataset segment length by (i) forming a graph of the different numbers of segments produced via the iterative segmenting process and (ii) identifying a knee point within the graph, wherein the knee point of the graph corresponds to a segment length and is selected as the time-dependent dataset segment length, the knee point comprising a local maximum of the graph.

15. The computer program product of claim 12, wherein the determining comprises (i) identifying that a number of the subset transition points are below a lower threshold boundary of the threshold test and (ii) augmenting the subset transition points with an additional segmentation of the multi-variate time-dependent datasets utilizing the representative segment length.

16. The computer program product of claim 12, wherein the determining comprises (i) identifying that a number of the subset transition points are above an upper threshold boundary of the threshold test and (ii) selecting the representative segment length as the segment length.

17. The computer program product of claim 12, wherein the determining comprises (i) identifying that a number of the subset transition points are within a lower threshold boundary and an upper threshold boundary of the threshold test and (ii) selecting the subset transition points as the segment change points.

18. The computer program product of claim 12, wherein identifying a feature subset comprises mapping a given segment within a cluster to the time-dependent dataset that the given segment occurs within.

19. The computer program product of claim 12, wherein selecting a representative segment length for a given cluster comprises averaging the segment lengths within the given cluster.

20. A method, comprising:

receiving a time series dataset comprising a plurality of time-dependent features;

identifying, for each of the plurality of time-dependent features, change points within a given time-dependent feature, wherein a change point corresponds to an aspect within a given time-dependent feature that has a value change amount that meets a predetermined threshold and occurs over a period of time;

segmenting each of the plurality of time-dependent features at the change points identified for a given time-dependent feature, wherein segments of each of the time-dependent feature resulting from the segmenting have different lengths, wherein a number of segments for each of the plurality of time-dependent features differs between the plurality of time-dependent features;

clustering the segments across the time series dataset into clusters having similar lengths of segments, wherein at least one of the clusters comprises segments from more than one of the plurality of time-dependent features;

for each cluster (i) selecting a representative segment length and (ii) identifying a feature subset in that cluster, wherein a feature subset comprises features from the time-dependent features that can be represented by the representative segment for the given cluster;

generating a new multi-variate time series feature from the representative segment lengths and the feature subsets of the clusters;

identifying, across the new-multi-variate time series dataset, subset change points, wherein each of the subset change points corresponds to an aspect within a given feature subset that has a value change amount that meets a predetermined threshold and occurs over a period of time; and determining, by applying a threshold test to the subset change points, a segment length to be used in segmenting the time series dataset.

* * * * *